(12) United States Patent
Nakae

(10) Patent No.: US 8,585,463 B2
(45) Date of Patent: Nov. 19, 2013

(54) PROCESS FOR PRODUCING GLASS SUBSTRATE FOR INFORMATION RECORDING MEDIUM

(75) Inventor: Hazuki Nakae, Kyoto (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/807,797

(22) PCT Filed: Jun. 23, 2011

(86) PCT No.: PCT/JP2011/003604
§ 371 (c)(1),
(2), (4) Date: Dec. 31, 2012

(87) PCT Pub. No.: WO2012/001924
PCT Pub. Date: Jan. 5, 2012

(65) Prior Publication Data
US 2013/0102229 A1    Apr. 25, 2013

(30) Foreign Application Priority Data
Jun. 29, 2010  (JP) ................................. 2010-147404

(51) Int. Cl.
*B24B 1/00* (2006.01)
*C03B 18/02* (2006.01)
(52) U.S. Cl.
USPC .................................. 451/41; 65/61; 438/693

(58) Field of Classification Search
USPC ............ 451/37, 41; 65/61; 438/692, 693, 691
See application file for complete search history.

(56) References Cited

U.S. PATENT DOCUMENTS

| | | | |
|---|---|---|---|
| 6,553,788 B1 | 4/2003 | Ikeda et al. | |
| 7,065,984 B2 * | 6/2006 | Kezuka et al. | 451/41 |
| 7,604,882 B2 * | 10/2009 | Kezuka et al. | 428/846.9 |
| 2008/0220700 A1 * | 9/2008 | Minami et al. | 451/364 |
| 2009/0158775 A1 | 6/2009 | Takizawa et al. | |
| 2009/0286454 A1 * | 11/2009 | Kezuka et al. | 451/41 |
| 2011/0171415 A1 | 7/2011 | Eda et al. | |
| 2012/0244388 A1 * | 9/2012 | Nakashima et al. | 451/37 |

FOREIGN PATENT DOCUMENTS

| | | |
|---|---|---|
| JP | 2000-311336 | 11/2000 |
| JP | 2008-246645 | 10/2008 |
| JP | 2009-193608 | 8/2009 |
| WO | WO 2007/111167 | 10/2007 |
| WO | WO 2010/038741 | 4/2010 |

\* cited by examiner

*Primary Examiner* — Maurina Rachuba
(74) *Attorney, Agent, or Firm* — Cozen O'Connor

(57) ABSTRACT

According to the process for producing a glass substrate for an information-recording medium of the present invention, a glass plate 10 is roughly polished by a polishing machine 1 using a polishing liquid 7 containing a polishing agent containing cerium oxide as a main component in the rough polishing step, followed by cleaning so as to adjust the amount of cerium oxide on the surface of the glass plate to be 0.125 ng/cm2 or less. The glass plate after rough polishing is thereafter finely polished with a polishing agent containing colloidal silica in the fine polishing step.

4 Claims, 4 Drawing Sheets

FIG.2

| COMPOSITION (% BY MASS) | Li$_2$O | Na$_2$O | K$_2$O | MgO | CaO | Al$_2$O$_3$ | SiO$_2$ | TiO$_2$ | ZrO$_2$ | CeO$_2$ | SnO$_2$ | Nb$_2$O$_5$ | TOTAL |
|---|---|---|---|---|---|---|---|---|---|---|---|---|---|
| GLASS PLATE A | 7.3 | 3.0 | 1.8 | 2.4 | 0.0 | 14.2 | 65.0 | 1.9 | 0.0 | 2.0 | 0.0 | 2.4 | 100.0 |
| GLASS PLATE B | 3.6 | 11.1 | 0.4 | 0.6 | 1.6 | 14.7 | 64.8 | 0.0 | 2.0 | 0.5 | 0.7 | 0.0 | 100.0 |
| GLASS PLATE C | 3.6 | 11.1 | 0.4 | 0.6 | 1.6 | 14.7 | 64.3 | 0.0 | 2.0 | 1.0 | 0.7 | 0.0 | 100.0 |
| GLASS PLATE D | 3.6 | 11.1 | 0.4 | 0.6 | 1.6 | 14.7 | 63.3 | 0.0 | 2.0 | 2.0 | 0.7 | 0.0 | 100.0 |

FIG.3

| | TYPE OF GLASS PLATE | Ce ADHERED AMOUNT (ng/cm²) | STOCK REMOVAL (μm) | (C) (μg/LITER) | 5TH Ra | 7TH Ra | 20TH Ra | OUTER PERIMETER TIR (μm) | INNER PERIMETER TIR (μm) |
|---|---|---|---|---|---|---|---|---|---|
| EXAMPLE 1 | GLASS PLATE A | 0.121 | 0.8 | 2.9 | VERY GOOD | GOOD | GOOD | 0.65 | 0.34 |
| EXAMPLE 2 | GLASS PLATE B | 0.11 | 1.9 | 1.7 | VERY GOOD | VERY GOOD | VERY GOOD | 0.53 | 0.24 |
| EXAMPLE 3 | GLASS PLATE C | 0.122 | 1.0 | 1.8 | VERY GOOD | VERY GOOD | VERY GOOD | 0.45 | 0.17 |
| EXAMPLE 4 | GLASS PLATE D | 0.109 | 0.7 | 2.5 | VERY GOOD | GOOD | GOOD | 0.6 | 0.42 |
| COMPARATIVE EXAMPLE 1 | GLASS PLATE D | 0.523 | 0.8 | 2.9 | POOR | POOR | POOR | 0.78 | 0.44 |
| EXAMPLE 5 | GLASS PLATE D | 0.121 | 0.7 | 2.9 | VERY GOOD | GOOD | GOOD | 0.65 | 0.4 |
| EXAMPLE 6 | GLASS PLATE D | 0.0989 | 0.7 | 2.9 | VERY GOOD | VERY GOOD | VERY GOOD | 0.53 | 0.4 |
| EXAMPLE 7 | GLASS PLATE D | 0.119 | 1.5 | 2.7 | VERY GOOD | VERY GOOD | VERY GOOD | 0.56 | 0.42 |
| EXAMPLE 8 | GLASS PLATE C | 0.121 | 1.2 | 2.1 | VERY GOOD | VERY GOOD | VERY GOOD | 0.57 | 0.41 |
| EXAMPLE 9 | GLASS PLATE C | 0.123 | 0.8 | 1.4 | VERY GOOD | GOOD | GOOD | 0.53 | 0.38 |
| EXAMPLE 10 | GLASS PLATE C | 0.121 | 0.5 | 0.9 | GOOD | GOOD | GOOD | 0.54 | 0.38 |
| EXAMPLE 11 | GLASS PLATE C | 0.121 | 0.2 | 0.4 | GOOD | GOOD | GOOD | 0.55 | 0.39 |

PROCESS FOR PRODUCING GLASS SUBSTRATE FOR INFORMATION RECORDING MEDIUM

RELATED APPLICATIONS

This is a U.S. National Phase Application under 35 USC 371 of International Application PCT/JP2011/003604 filed on Jun. 23, 2011.

This application claims the priority of Japanese application no. 2010-147404 filed Jun. 29, 2010, the entire content of which is hereby incorporated by reference.

TECHNICAL FIELD

The present invention relates to a process for producing a glass substrate for an information-recording medium.

BACKGROUND ART

Hard disks are required to have high capacity and to be produced with reduced cost. Under such circumstances, glass substrates are required to have high smoothness and cleanliness as well as to have high productivity. In order to achieve high smoothness, a method is known in which a colloidal silica polishing agent is used for a final polishing step. As a means to improve the productivity at the same time, Patent Document 1, for example, discloses a polishing machine in which polishing liquid containing colloidal silica is circulated.

Patent Document 1: Japanese Patent Application Laid-open No. 2008-246645

SUMMARY OF THE INVENTION

An object of the present invention is to provide a process for producing a glass substrate for an information-recording medium which can prevent the reduction in recycle number of times of silica-based abrasive grains upon fine polishing of a glass plate containing cerium oxide and which can provide a glass substrate for an information-recording medium having a preferable flatness.

Thus, the present invention is a process for producing a glass substrate for an information-recording medium having a chemically reinforced layer formed with a chemical reinforcing liquid on a surface of a disk-shaped glass plate containing 0.01% by mass to 2% by mass of cerium oxide, with the glass substrate being configured to have TIR of 0.7 μm or less per cycle in a circumferential direction at a position 0.75×r1 distant from the center of the glass plate, when r1 is a radius of an outer perimeter of the glass plate, due to polishing of the surface in a step of rough polishing and a step of fine polishing, wherein the glass plate is roughly polished with a polishing agent containing cerium oxide as a main component in the rough polishing step, the glass plate after rough polishing is finely polished with a polishing agent containing silica-based abrasive grains in the fine polishing step, and the glass plate after the rough polishing step is cleaned before the fine polishing step so as to adjust the amount of cerium oxide on the surface of the glass plate to be 0.125 ng/cm² or less.

The above and other objectives, features and advantages will be apparent from the following detailed descriptions and attached figures.

BRIEF DESCRIPTION OF THE DRAWINGS

FIG. 2 is a table showing compositions of glass plates A to D used in Examples.

FIG. 3 is a table showing Ce adhered amount after rough polishing, evaluation result based on surface roughness after fine polishing, measured values of outer perimeter TIR and inner perimeter TIR and the like of Examples 1 to 11 and Comparative Example 1.

DESCRIPTION OF EMBODIMENTS

Figure 1:
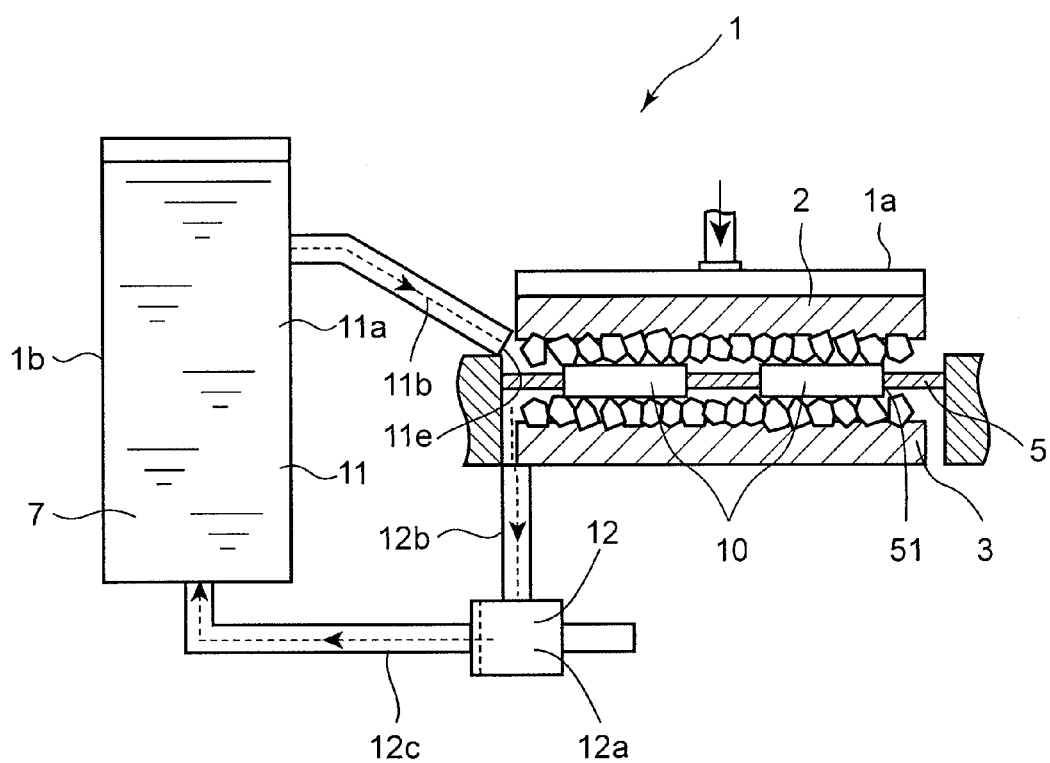
FIG. 1 is a diagram depicting one embodiment of a polishing machine used in the step of rough and fine polishing of the process for producing of the present invention.

Based on the research carried out by the present inventors, when a polishing liquid containing colloidal silica as a polishing agent is recycled, colloidal silica becomes aggregated over time, making use of the colloidal silica as the polishing agent difficult. In such a case, there is a technique for extending the recycle period by removing aggregated colloidal silica with a filter. However, when the aggregated colloidal silica is smaller than the filter, it passes through the filter and therefore it is difficult to obtain the effect of the filtration. Particularly, as colloidal silica recently used has the size of about 20 nm, it is difficult to remove the aggregated colloidal silica.

Cerium oxide can also act as a polishing agent due to the polishing mechanism thereof. In this polishing mechanism, when pressure is applied, the main composition of the surface of a glass plate, Si—O, is replaced by cerium oxide to form the linkage Ce—O. Although this Ce—O linkage is immediately cleaved, the cleaved Ce is not involved in the linkage again. Polishing is performed by repeating such replacement and linking.

Based on the research carried out by the present inventor, when cerium oxide is present upon polishing with silica-based abrasive grains, cerium binds to a hydroxyl group of the silica-based abrasive grains to reduce dispersion property of the silica-based abrasive grains. The reason for this is believed that the above polishing mechanism of cerium oxide acts on silica-based abrasive grains (and sludge) in the similar manner as described above. Because of this, when a polishing liquid (slurry) is recycled, aggregation of silica-based abrasive grains is increased to deteriorate the smoothness of a glass substrate. In addition, cerium oxide is accumulated in the polishing machine, increasing adverse effects on the smoothness. Moreover, cerium oxide remains until the final step to penetrate deeply into the glass plate, thereby deteriorating the cleanliness of the final glass substrate.

Cerium oxide, which is contained in a glass plate for environmental measures and eluted from the glass plate upon polishing, also causes the similar problem as cerium oxide which is used as the polishing agent during rough polishing. It is expected that cerium oxide which is contained in a glass and eluted upon polishing is varied in the size and electronic state, making colloidal silica to be aggregated more easily. Accordingly, colloidal silica is more significantly aggregated when a glass plate containing cerium oxide is polished, and therefore the recycle number of times of colloidal silica is further reduced. It is also known that aggregation of colloidal silica may deteriorate TIR. TIR (Total Indicated Runout) is an index indicating the flatness of a glass substrate (glass plate) and it is important to reduce TIR in the circumferential direction.

When a chemically reinforced layer is formed with a chemical reinforcing liquid prior to the fine polishing step, ion exchange by the chemical reinforcing treatment needs to be sufficiently uniform, otherwise the compression stress acting on the surface is out of balance to deteriorate the flatness and the TIR in the circumferential direction is difficult to be sufficiently lowered.

Therefore, by providing composition which can lower the TIR and suppressing gelation or aggregation of colloidal silica, the TIR is significantly improved, and when a glass substrate for an information-recording medium produced is applied to a disk device, the glass substrate can contribute to reduction in flying height of a magnetic head provided in the disk device and the capacity of the glass substrate for an information-recording medium can be increased.

The present invention has been achieved based on the above research results.

Preferable embodiments and examples of the present invention are described hereinbelow. However, the process for producing of the present invention is not limited to the embodiments and examples described below.

The process for producing a glass substrate for an information-recording medium according to the present embodiment comprises the steps of disk processing, lapping, rough polishing (primary polishing), cleaning, chemical reinforcing, fine polishing (secondary polishing) and final cleaning. The glass substrate is produced by these steps.

A glass plate used in this embodiment is prepared from a glass material having the glass composition on oxide basis of $SiO_2$: 55 to 75% by mass, $Al_2O_3$: 5 to 18% by mass, $Li_2O$: 1 to 10% by mass, $Na_2O$: 3 to 15% by mass, $K_2O$: 0.1 to 5% by mass, provided that the total amount of $Li_2O+Na_2O+K_2O$: 10 to 25% by mass, MgO: 0.1 to 5% by mass, CaO: 0.1 to 5% by mass, CeO: 0.01 to 2% by mass, $ZrO_2$: 0 to 8% by mass, wherein the mass ratio of (MgO+CaO) to ($Li_2O+Na_2O+K_2O$) is in the range of 0.10 (MgO+CaO)/($Li_2O+Na_2O+K_2O$) ≤0.80.

Figure 4:
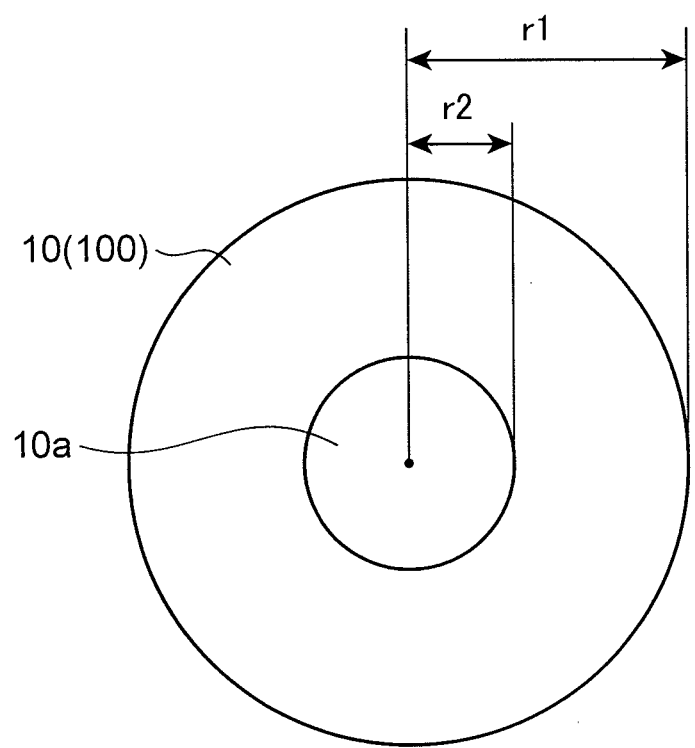
FIG. 4 is a diagram depicting the inner perimeter TIR and the outer perimeter TIR.

In the disk processing step, a glass plate 10 formed into a plate shape from the above glass material is processed into a disk-shaped glass plate having a through-hole 10a (shown in FIG. 4). In the disk processing step, the glass material may be formed into a disk-shaped glass plate having an outer diameter of 2.5 inches, 1.8 inches, 1 inch, 0.8 inches etc., and a thickness of 2 mm, 1 mm, 0.63 mm etc. However, the size and thickness of the glass plate formed in the disk processing step is not particularly limited.

In the lapping step, the glass plate is processed so as to have a predetermined thickness. In the present embodiment, the lapping step comprises two steps, i.e., the steps of first lapping and second lapping.

In the first lapping step, both sides of the glass plate are subjected to lapping process in order to preliminarily adjust the whole shape of the glass plate, i.e., the parallelism, flatness and thickness of the glass plate.

In the second lapping step, both sides of the glass plate are subjected to lapping process again to finely adjust the parallelism, flatness and thickness of the glass plate.

In the rough polishing step, the surface of the glass plate after the step of lapping is roughly polished. This step of rough polishing aims to eliminate scratches and distortions remaining from the step of lapping and is carried out on a polishing machine.

In the present embodiment, a polishing machine 1 may be a machine which allows simultaneous polishing of double side as shown in FIG. 1. The polishing machine 1 comprises a machine main body 1a and a polishing liquid feeder 1b which feeds a polishing liquid to the machine main body 1a.

The machine main body 1a comprises a disk-shaped upper board 2 and a disk-shaped lower board 3 which are arranged so as to be parallel each other with a distance in a vertical direction. These boards rotate in the opposite direction each other.

The upper and lower boards 2 and 3 have on each opposing surface a polishing pad for polishing two sides of the glass plate 10. The polishing pads used in the rough polishing step may be, for example, polyurethane hard polishing pads. Between the upper and lower boards 2 and 3, a plurality of rotatable carriers 5 is provided.

The carriers 5 are provided with a plurality of plate holding holes 51 into which glass plates 10 are fit. In this embodiment, the carriers 5 are configured to hold 100 glass plates 10, so that 100 glass plates 10 can be processed in one procedure (one batch). The upper and lower boards 2 and 3 can be driven by different sources.

The carriers 5 sandwiched between the upper and lower boards 2 and 3 via polishing pads hold a plurality of glass plates 10 and rotate while revolving in the same direction as the lower board 3 relative to the center of rotation of the upper and lower boards 2 and 3. While the polishing machine 1 is acting as above, a polishing liquid 7 (slurry) is fed between the upper board 2 and the glass plate 10 and between the lower board 3 and the glass plate 10, respectively, so that the glass plate 10 can be roughly polished.

The polishing liquid feeder 1b comprises a liquid reservoir 11 and a liquid collector 12. The liquid reservoir 11 comprises a liquid reservoir main body 11a and a liquid feeding line 11b having a discharge port 11e extending from the liquid reservoir main body 11a to the machine main body 1a.

The liquid collector 12 comprises a liquid collector main body 12a, a liquid collecting line 12b extending from the liquid collector main body 12a to the machine main body 1a and a liquid returning line 12c extending from the liquid collector main body 12a to the polishing liquid feeder 1b.

The polishing liquid 7 placed in the liquid reservoir main body 11a is fed to the machine main body 1a from the discharge port 11e of the liquid feeding line 11b and recovered into the liquid collector main body 12a from the machine main body 1a through the liquid collecting line 12b.

The recovered polishing liquid 7 is returned to the liquid reservoir 11 through the liquid returning line 12c and can be fed again to the machine main body 1a.

The polishing liquid 7 used in the rough polishing step contains a polishing agent which contains a rare-earth oxide, i.e., cerium oxide having a fluorine content of 5% by mass or less as a main component. The average particle diameter of the polishing agent used in the rough polishing step is preferably 1 μm.

The glass plate after rough polishing with the cerium polishing agent is cleaned in the cleaning step. For example, the glass plate is first cleaned with an alkaline detergent having pH of 13 or more and then rinsed. The glass plate is then cleaned with an acidic detergent having pH of 1 or less, rinsed and finally cleaned with a hydrofluoric acid (HF) solution. With regard to cerium oxide, cleaning by alkaline cleaning, acid cleaning and HF in this order is the most effective. Such cleaning can first disperse and remove the polishing agent with the alkaline detergent, then dissolve and remove the polishing agent with the acid detergent and finally etch the glass plate with HF to remove the polishing agent which is deeply penetrated into the glass plate.

In this case, cleaning in one bath with these agents can not provide effective cleaning. Particularly, if the acid detergent and HF are in the same bath, the substrate can not be uniformly etched because the etching speed of HF is reduced at the place where the amount of the polishing agent is high. It is also preferable to use a rinsing bath after each cleaning procedure. These agents may be optionally added with a surfactant, dispersing agent, chelating agent, reducing agent and the like. It is also preferable to apply ultrasonic to respective cleaning baths and use degassed water for respective agents. In addition to the above, when cerium oxide is used in the step of lapping (inner diameter processing and outer diameter processing), it is preferable to carry out HF cleaning after each processing step.

The cleaning of the glass plate after rough polishing is carried out so as to adjust the amount of cerium oxide on the surface of the glass plate to be 0.125 ng/cm$^2$ or less. If the amount of cerium oxide on the surface of the glass plate exceeds 0.125 ng/cm$^2$, the flatness of the glass plate after the fine polishing step may be deteriorated. More specifically, if the amount exceeds 0.125 ng/cm$^2$, the indicators of the flatness in the circumferential direction of the glass plate after fine polishing, the outer perimeter TIR and the inner perimeter TIR, can not be 0.7 μm or less and 0.5 μm or less, respectively.

When the substrate for an information-recording medium finally obtained has the outer perimeter TIR and the inner perimeter TIR of 0.7 μm or less and 0.5 μm or less, respectively, the risk of possible crash (contact) of a magnetic head provided in a disk device with the substrate for an information-recording medium may be reduced.

For that purpose, the cleaning of the glass plate after rough polishing is performed to adjust the amount of cerium oxide on the surface of the glass plate to be 0.125 ng/cm$^2$ or less in this embodiment.

In the chemical reinforcing step, the glass plate is soaked in a chemical reinforcing liquid to form a chemically reinforced layer on the glass substrate. The formation of the chemically reinforced layer can improve impact resistance, vibration resistance, heat resistance and the like.

The chemical reinforcing step is carried out by an ion exchange method in which an alkaline metal ion such as lithium, sodium or the like ion contained in the glass plate is replaced by an alkaline metal ion such as potassium or the like ion having a higher ion radius than the former alkaline metal ion by soaking the glass plate in a heated chemical reinforcing liquid. The surface of the glass plate is reinforced by means of compression stress generated in the ion exchanged area due to distortion resulting from the difference in radius of the ions.

In this embodiment, the chemical reinforcing step is applied to the glass plate having $(MgO+CaO)/(Li_2O+Na_2O+K_2O)$ in the range of $0.1 \leq (MgO+CaO)/(Li_2O+Na_2O+K_2O) \leq 0.80$, so that the glass plate can have appropriate heat resistance and be prevented from heat deformation during the chemical reinforcing step. Moreover, ion exchange during the chemical reinforcing step can be carried out uniformly, and the surface of the glass plate can be evenly applied with compression stress, so that the flatness of the glass plate can be lowered.

Thus, according to the present embodiment, fine polishing even after the chemical reinforcing step can be carried out with approximately uniform stock removal throughout the whole glass plate, allowing preferable flatness after fine polishing.

The fine polishing step is described hereinbelow. In the fine polishing step, mirror polishing is carried out in which the flat and smooth main surface obtained in the rough polishing step described above is maintained while a smooth mirror surface having, for example, a maximum height (Rmax) of the surface roughness of the main surface of about 6 nm or less is obtained. The fine polishing step is carried out, for example, on the same polishing machine used in the rough polishing step except that the hard polishing pad is changed to a soft polishing pad.

A polishing agent used in the fine polishing step is the one containing silica-based abrasive grains (colloidal silica) having a lower particle diameter than the cerium-based polishing agent in the rough polishing step and having an average particle diameter of 20 nm. In this embodiment, the polishing agent containing colloidal silica is used.

The surface of the glass plate is subjected to mirror polishing by feeding a polishing liquid (slurry) containing the above polishing agent on the glass plate and sliding the polishing pad and the glass plate each other. The amount removed by the fine polishing (stock removal) is 0.2 μm to 2 μm and preferably 0.3 μm to 1.5 μm. When the amount to be polished is too low, flatness and smoothness can not be maintained, and when the amount is too high, the amount of cerium is increased. Flatness and smoothness as well as stability (for recycle) can be secured by polishing at 0.3 μm to 1.5 μm.

The slurry is recycled for example by the polishing liquid feeder 1b of the polishing machine 1. When the slurry is recycled, various factors are controlled so as to satisfy the following condition:

$$(X \times Z) \times b/a < 3 (\mu g/liter) \quad (2),$$

wherein (a) is the volume (liter) of the slurry; (b) is the number of glass plates polished; (X) is the content (% by mass) of cerium oxide of the glass plates; (Y) is the stock removal (μm); and $$Z = Y \times \text{area of substrate}(cm^2) \times \text{density of substrate}(g/cm^3) \quad (1).$$

In one embodiment, when the volume of the slurry (a) is 30 liters, the number of the glass plates (b) is about 100.

The step of cleaning of the glass plate after the fine polishing step may be carried out as follows, for example. The glass plate after the fine polishing step is stored in water without being dried (including the absence of air drying) and transferred to the next step of cleaning while it is wet. If the glass plate is dried with the polishing agent remaining thereon, the removal of the polishing agent (colloidal silica) may be sometimes difficult in the step of cleaning. It is necessary to remove the polishing agent without roughening the mirror finished surface of the glass plate.

For example, a cleaning solution having an etching or leaching action to the glass plate may roughen the glass surface which has been daringly mirror-finished to result in an aventurine finished surface. Such an aventurine finished surface can not sufficiently reduce the flying height of a magnetic head.

Thus, it is preferable that the cleaning solution is formulated so that it does not have an etching or leaching action to glass and it has a selective dissolving ability of a silica-based polishing agent. Namely, it is preferable to choose the cleaning solution which does not contain hydrofluoric acid (HF) or hydrofluorosilicic acid ($H_2SiF_6$) which may cause etching of glass. Following this step of final cleaning, the glass substrate for an information-recording medium is obtained.

A suitable example may include cleaning with an alkaline detergent having pH of 13, rinsing, cleaning with an acidic detergent (nitric acid) having pH of 0, rinsing and final cleaning with HF (a 0.1% solution).

With regard to cerium oxide, cleaning by alkaline cleaning, acid cleaning and HF in this order is the most effective. Such cleaning can first disperse and remove the polishing agent with the alkaline detergent, then dissolve and remove the polishing agent with the acid detergent and finally etch the glass plate with HF to remove the polishing agent which is deeply penetrated into the glass plate. Respective agents are degassed and cleaning is carried out while applying ultrasonic. Degassing may allow removal of strongly adhered cerium oxide.

The use of ultrasonic may increase cavitation effect and increase dispersing effect of the alkaline detergent. Ultrasonic may be applied at 40 kHz, 80 kHz and 170 kHz when using the alkaline detergent, the acid detergent and the HF detergent, respectively. Application of ultrasonic at 80 kHz when using the acid detergent may increase dissolving property of small adhered materials. It is preferable to apply ultrasonic at 170 kHz when using HF because much finer cerium oxide may be removed.

In the above embodiment, the chemical reinforcing step is carried out after the rough polishing step and before the fine polishing step. However, the present invention is not limited to this embodiment and can be appropriately modified. For example, the chemical reinforcing step may be carried out prior to the rough polishing step or after the fine polishing step.

However, when the chemical reinforcing step is carried out prior to the rough polishing step, the chemically reinforced layer formed in the chemical reinforcing step may possibly be thinner or lost. On the other hand, when the chemical reinforcing step is carried out after the fine polishing step, the flatness may possibly be deteriorated due to heat deformation in the chemical reinforcing step. Therefore, it is preferable to carry out the chemical reinforcing step after the rough polishing step and before the fine polishing step as the above embodiment.

EXAMPLES

The present invention is further described in detail with specific examples hereinbelow. Four glass plates A to D having compositions shown in FIG. 2 were prepared.

Example 1

The glass plate A was subjected to the steps of disk processing, end face mirror polishing and lapping according to well known techniques. The glass plate after the lapping step (hereinafter a glass plate after the lapping step is referred to as a glass substrate precursor) was subjected to the rough polishing step using the polishing machine 1 shown in FIG. 1 having a polyurethane hard polishing pad. In the rough polishing step, a polishing agent which contains cerium oxide having a fluorine content of 5% by mass or less as a main component and has an average particle diameter of 1 μm was fed to the glass substrate precursor, the hard polishing pad and the glass plate were moved relatively each other to roughly polish the main surface of the glass substrate precursor.

Next, the cleaning step was carried out. In this step, cleaning with an alkaline detergent having pH of 13, rinsing, cleaning with an acidic detergent (nitric acid) having pH of 0, rinsing and final cleaning with HF (a 0.1% solution) were carried out. Application conditions were 40 kHz, 80 kHz and 170 kHz for the alkaline detergent, the acid detergent and the HF detergent, respectively.

After cleaning, the cerium oxide adhered amount on the surface of the glass substrate precursor was measured. The measurement was carried out on an inductively coupled plasma mass spectrometer (ICP-MS), and the average for 10 glass plates is shown in FIG. 3.

After the cleaning step, the chemical reinforcing step was carried out by soaking the glass plate in a heated chemical reinforcing liquid.

After the chemical reinforcing step, the fine polishing step was carried out. In the fine polishing step, 30 liters of slurry containing colloidal silica having an average particle diameter of 20 nm, which is lower than the particle diameter of the cerium-based polishing agent in the rough polishing step, were used and recycled. The slurry was fed to the glass substrate precursor after the cleaning step and the polishing pad and the glass substrate precursor were slid each other to mirror polish the surface of the glass substrate precursor. The stock removal (Y) removed by the fine polishing was 0.8 μm. Provided that the left hand side of the formula (2), (X×Z)×b/a, is referred to as (c), various factors for the recycle were selected so as to obtain (c) of 2.9 under the above conditions, in view of a preferable balance between composition ratios of the glass substrate precursor and the slurry and the stock removal (Y).

The slurry was recycled 20 times in the fine polishing step (100 glass substrate precursors were polished at one time) and quality of the slurry at 5th, 7th and 20th cycles was evaluated on a four-point scale of "very good", "good", "fair" and "poor". The evaluation was based on the surface roughness Ra at each cycle (5th, 7th or 20th).

The surface roughness Ra is the surface roughness of a square region of 5 μm long and 5 μm wide on the main surface of the glass substrate after the step of final cleaning. Ten glass substrates were examined under an atomic force microscope (AFM) and the average Ra of not less than 0.3 Å and less than 1.0 Å, of not less than 1 Å and less than 1.5 Å, of not less than 1.5 Å and less than 2.0 Å or of not less than 2.0 Å was rated as "very good", "good", "fair" and "poor", respectively.

The main surface of the glass substrate after final cleaning was measured for outer perimeter TIR and inner perimeter TIR. The outer perimeter TIR and inner perimeter TIR were measured for one glass substrate among the glass substrates at each of 5th, 7th and 20th cycles and the measured values were averaged, which are shown in FIG. 3. The outer perimeter TIR is the TIR in the circumferential direction per track measured at a position satisfying 0.75×r1, wherein r1 is a radius of the glass substrate 100 for an information-recording medium (glass plate 10) as shown in FIG. 4.

The inner perimeter TIR is the TIR in the circumferential direction per track measured at a position satisfying (2×r2+r1)/3, wherein r1 is a radius of the glass substrate 100 for an information-recording medium (glass plate 10) and r2 is a radius of a through hole 10a of the glass substrate 100 for an information-recording medium (glass plate 10) as shown in FIG. 4.

Example 2

The glass plate B was subjected to the steps of disk processing, end face mirror polishing and lapping according to well known techniques to obtain a glass substrate precursor. This glass substrate precursor was subjected to the steps of rough polishing and cleaning as described in Example 1, and the cerium oxide adhered amount on the surface of the glass substrate precursor after cleaning was measured in the same manner as Example 1.

The step of chemical reinforcing followed and the fine polishing step was carried out as described in Example 1 except that the stock removal (Y) was changed to 1.9. In the step of cleaning, various factors for recycle were selected so as to obtain (c) of 1.7 under the above conditions. The surface roughness Ra at each cycle (5th, 7th and 20th) was measured for evaluation and the outer perimeter TIR and the inner perimeter TIR of the main surface of the glass substrate were measured in the same manner as Example 1.

Example 3

The glass plate C was subjected to the steps of disk processing, end face mirror polishing and lapping according to well known techniques to obtain a glass substrate precursor. This glass substrate precursor was subjected to the steps of rough polishing and cleaning as described in Example 1, and the cerium oxide adhered amount on the surface of the glass substrate precursor after cleaning was measured in the same manner as Example 1.

The step of chemical reinforcing followed and the fine polishing step was carried out as described in Example 1 except that the stock removal (Y) was changed to 1.0. In the step of cleaning, various factors for recycle were selected so as to obtain (c) of 1.8 under the above conditions. The surface roughness Ra at each cycle (5th, 7th and 20th) was measured for evaluation and the outer perimeter TIR and the inner perimeter TIR of the main surface of the glass substrate were measured in the same manner as Example 1.

Example 4

The glass plate D was subjected to the steps of disk processing, end face mirror polishing and lapping according to well known techniques to obtain a glass substrate precursor. This glass substrate precursor was subjected to the steps of rough polishing and cleaning as described in Example 1, and the cerium oxide adhered amount on the surface of the glass substrate precursor after cleaning was measured in the same manner as Example 1.

The step of chemical reinforcing followed and the fine polishing step was carried out as described in Example 1 except that the stock removal (Y) was changed to 0.7. In the step of cleaning, various factors for recycle were selected so as to obtain (c) of 2.5 under the above conditions. The surface roughness Ra at each cycle (5th, 7th and 20th) was measured for evaluation and the outer perimeter TIR and the inner perimeter TIR of the main surface of the glass substrate were measured in the same manner as Example 1.

Example 5

The glass plate D was subjected to the steps of disk processing, end face mirror polishing and lapping according to well known techniques to obtain a glass substrate precursor. This glass substrate precursor was subjected to the steps of rough polishing and cleaning under the same conditions as described in Example 1, and the cerium oxide adhered amount on the surface of the glass substrate precursor was measured. The steps of chemical reinforcing and fine polishing followed under the same conditions as described in Example 1, the surface roughness Ra at each cycle (5th, 7th and 20th) was measured for evaluation and the outer perimeter TIR and the inner perimeter TIR of the main surface of the glass substrate were measured in the same manner as Example 1.

Example 6

The glass plate D was subjected to the steps of disk processing, end face mirror polishing and lapping according to well known techniques to obtain a glass substrate precursor. This glass substrate precursor was subjected to the rough polishing step under the same conditions as described in Example 1. The step of cleaning followed under the following conditions.

The glass substrate precursor after the rough polishing step was washed with an alkaline detergent, nitric acid, an alkaline detergent and HF in this order. Ultrasonic was applied during each cleaning, which was US 40 kHz, US 80 kHz, 950 kHz and 170 kHz for the cleanings with the alkaline detergent, nitric acid, the alkaline detergent and HF, respectively. Respective baths, particularly the ultrasonic bath with the alkaline detergent (950 kHz), were degassed and the glass substrate precursor was cleaned.

The cerium oxide adhered amount on the surface of the glass substrate precursor after cleaning was measured. The steps of chemical reinforcing and fine polishing were carried out thereafter as described in Example 1, the surface roughness Ra at each cycle (5th, 7th and 20th) was measured for evaluation and the outer perimeter TIR and the inner perimeter TIR of the main surface of the glass substrate were measured in the same manner as Example 1.

Examples 7 to 11

The glass plate C was subjected to the steps of disk processing, end face mirror polishing and lapping according to well known techniques to obtain a glass substrate precursor. This glass substrate precursor was subjected to the steps of rough polishing and cleaning as described in Example 1 and the cerium oxide adhered amount on the surface of the glass substrate precursor was measured. The step of chemical reinforcing followed under the same conditions as described in Example 1.

In order to confirm the effect of the formula (2), the fine polishing step was carried out with the stock removal (Y) of 1.5 µm (Example 7), 1.2 µm (Example 8), 0.8 µm (Example 9), 0.5 (Example 10) and 0.2 µm (Example 11) so as to obtain the value of (c) of 2.7 µm (Example 7), 2.1 µm (Example 8), 1.4 µm (Example 9), 0.9 µm (Example 10) and 0.4 µm (Example 11). As Example 1, the surface roughness Ra at each cycle (5th, 7th and 20th) was measured for evaluation and the outer perimeter TIR and the inner perimeter TIR of the main surface of the glass substrate were measured.

Comparative Example 1

The glass plate D was subjected to the steps of disk processing, end face mirror polishing and lapping according to well known techniques to obtain a glass substrate precursor. This glass substrate precursor was subjected to the steps of rough polishing and cleaning under the same conditions as described in Example 1, and the cerium oxide adhered amount on the surface of the glass substrate precursor was measured.

Instead of the cleaning step as performed in Example 1, the cleaning step of Comparative Example used a cleaning solution obtained by mixing citric acid, sulfamic acid and HF was carried out with ultrasonic applied at 120 kHz. In this cleaning step, various factors for recycle were selected so as to obtain (c) of 2.9 under the above conditions. The cerium oxide adhered amount on the surface of the glass substrate precursor was then measured.

The fine polishing step under the same conditions as Example 1 followed, the surface roughness Ra at each cycle (5th, 7th and 20th) was measured for evaluation and the outer perimeter TIR and the inner perimeter TIR of the main surface of the glass substrate were measured as Example 1.

As described above, the present specification discloses the techniques of various embodiments. Main techniques among these are summarized hereinafter.

The process for producing a glass substrate for an information-recording medium according to one aspect of the present invention is characterized in that it is the process for producing a glass substrate for an information-recording medium having a chemically reinforced layer formed with a chemical reinforcing liquid on a surface of a disk-shaped glass plate containing 0.01% by mass to 2% by mass of cerium oxide, the glass substrate being configured to have TIR of 0.7 µm or less per cycle in a circumferential direction at a position 0.75×r1 distant from the center of the glass plate, when r1 is a radius of an outer perimeter of the glass plate, due to polishing of the surface in a step of rough polishing and a step of fine polishing, wherein the glass plate is roughly polished with a polishing agent containing cerium oxide as a main component in the rough polishing step, the glass plate after rough polishing is finely polished with a polishing agent containing silica-based abrasive grains in the fine polishing step and the glass plate after the rough polishing step is cleaned before the fine polishing step so as to adjust the amount of cerium oxide on the surface of the glass plate to be 0.125 ng/cm$^2$ or less.

TIR refers to an index indicating the flatness (degree of undulation) of a glass plate (glass substrate for an information-recording medium) and to the sum of the distances to the highest and lowest points from the least squares plane of the evaluation surface (substrate surface).

According to this configuration, the recycle number of times of the polishing agent can be increased and thus the productivity can be improved because the glass plate after rough polishing is cleaned so as to adjust the amount of cerium adhered on the glass plate before the fine polishing step to be 0.125 ng/cm$^2$ or less. It is also possible to improve the smoothness and flatness of the final product glass substrate. Moreover, even when the glass plate containing cerium oxide from 0.01% by mass to 2% by mass is used, aggregation of the polishing agent in the fine polishing step can be prevented. Therefore, the productivity can be improved even when environment-friendly materials are used. In addition, the cleanliness of the final glass substrate can be secured and the smoothness of the glass substrate is not affected even when a strong acid is used. Accordingly, the present invention can secure high smoothness, high cleanliness and high environment conservation properties, and can provide significant effects such that upon fine polishing of glass plates containing cerium oxide, the recycle number of times of silica-based abrasive grains is increased and therefore the productivity is markedly improved.

In another aspect, the process for producing a glass substrate for an information-recording medium is characterized in that the silica-based grains are colloidal silica, a stock removal in the fine polishing step is 0.2 µm to 2 µm, and when a is the volume (liter) of a slurry containing the polishing agent used in the fine polishing step; b is the number of glass plates to be polished; X is the content (% by mass) of cerium oxide of the glass plates; Y is the stock removal (µm); and Z=Y×area of substrate (cm$^2$)×density of substrate (g/cm$^3$), the polishing in the fine polishing step is carried out so as to satisfy (X×Z)×b/a<3 (µg/liter).

In this embodiment, a suitable maximum recycle number of times of the slurry containing the polishing agent in the fine polishing step can be determined upon the control thereof with consideration for cerium oxide in the glass plate to be polished.

In another aspect, the process for producing a glass substrate for an information-recording medium is characterized in that the glass plate has a through-hole at the center thereof and the glass plate is finely polished so as to obtain TIR of 0.5 µm or less per cycle in the circumferential direction at a position (2×r2+r1)/3 from the center of the glass plate, when r2 is a radius of the through-hole.

According to this configuration, the glass substrate for an information-recording medium can be provided which, when it is applied to a disk device, can reduce the flying height of a magnetic head of the disk device, is easily tolerated to high-speed rotation, allows stable reading and writing and has reduced risk for read/write errors due to the contact of the magnetic head and the glass substrate for an information-recording medium.

In another aspect, the process for producing a glass substrate for an information-recording medium is characterized in that a glass composition of SiO$_2$: 55 to 75% by mass, Al$_2$O$_3$: 5 to 18% by mass, Li$_2$O: 1 to 10% by mass, Na$_2$O: 3 to 15% by mass, K$_2$O: 0.1 to 5% by mass, where the total amount of Li$_2$O+Na$_2$O+K$_2$O: 10 to 25% by mass, MgO: 0.1 to 5% by mass, CaO: 0.1 to 5% by mass, CeO: 0.01 to 2% by mass, ZrO$_2$: 0 to 8% by mass (including zero) and the mass ratio of (MgO+CaO) to (Li$_2$O+Na$_2$O+K$_2$O) is in the range of 0.10≤(MgO+CaO)/(Li$_2$O+Na$_2$O+K$_2$O)≤0.80, is used as the glass plate, and the chemically reinforced layer is formed on the glass plate having this composition.

According to this configuration, the glass plate has appropriate heat resistance and therefore heat deformation during the step of chemical reinforcing can be prevented. Moreover, ion exchange during the step of chemical reinforcing can be carried out uniformly, and the surface of the glass plate can be evenly applied with compression stress, so that the reduction in the flatness of the glass plate can be prevented. Therefore, when polishing is carried out after the step of chemical reinforcing, for example, the reduction in the flatness due to alteration in equilibrium of the chemically reinforced layer (compression stress layer) by polishing can be prevented.

This application is based on Japanese Patent Application No. 2010-147404 filed on Jun. 29, 2010, the content of which is incorporated herein.

The present invention has been appropriately and sufficiently described hereinabove by way of embodiments by referring to the figures in order to depict the present invention. It should be recognized that a person skilled in the art can easily modify and/or improve the above embodiments. Therefore, it is understood that such modifications or improvements carried out by a person skilled in the art are encompassed within the scope of the claims unless the modifications or improvements depart the scope of the claims.

INDUSTRIAL APPLICABILITY

According to the present invention, it is possible to prevent the reduction in the recycle number of times of silica-based abrasive grains upon fine polishing of a glass plate containing cerium oxide and to obtain a glass substrate for an information-recording medium having a preferable flatness.

The invention claimed is:

1. A process for producing a glass substrate for an information-recording medium having a chemically reinforced layer formed with a chemical reinforcing liquid on a surface of a disk-shaped glass plate containing 0.01% by mass to 2% by mass of cerium oxide, the glass substrate being configured to have TIR of 0.7 µm or less per cycle in a circumferential direction at a position 0.75×r1 distant from the center of the glass plate, when r1 is a radius of an outer perimeter of the glass plate, by polishing of the surface in a step of rough polishing and a step of fine polishing, wherein the glass plate is roughly polished with a polishing agent containing cerium oxide as a main component in the rough polishing step, the glass plate after rough polishing is finely polished with a polishing agent containing colloidal silica grains in the fine polishing step, a stock removal in the fine polishing step is 0.2 μm to 2 μm, when a is the volume (liter) of a slurry containing the polishing agent used in the fine polishing step; b is the number of glass plates to be polished; X is the content (% by mass) of cerium oxide of the glass plates; Y is the stock removal (μm); and $$Z = Y \times \text{area of substrate}(cm^2) \times \text{density of substrate}(g/cm^3) \qquad (1),$$

the polishing in the fine polishing step is carried out so as to satisfy $$(X \times Z) \times b/a < 3 (\mu g/liter) \qquad (2), \text{ and}$$

the glass plate after the rough polishing step is cleaned before the fine polishing step so as to adjust the amount of cerium oxide on the surface of the glass plate to be 0.125 ng/cm² or less.

2. The process for producing a glass substrate for an information-recording medium according to claim 1, wherein the glass plate has a through-hole at the center thereof; and the glass plate is finely polished so as to adjust TIR to be 0.5 μm or less per cycle in the circumferential direction at a position (2×r2+r1)/3 from the center of the glass plate, when r2 is a radius of the through-hole.

3. The process for producing a glass substrate for an information-recording medium according to claim 1, wherein a glass composition of SiO2: 55 to 75% by mass, Al2O3: 5 to 18% by mass, Li2O: 1 to 10% by mass, Na2O: 3 to 15% by mass, K2O: 0.1 to 5% by mass, where the total amount of Li2O+Na2O+K2O: 10 to 25% by mass, MgO: 0.1 to 5% by mass, CaO: 0.1 to 5% by mass, CeO: 0.01 to 2% by mass, ZrO2: 0 to 8% by mass (including zero), and the mass ratio of (MgO+CaO) to (Li2O+Na2O+K2O) is in the range of 0.10≤(MgO+CaO)/(Li2O+Na2O+K2O)≤0.80, is used as the glass plate, and the chemically reinforced layer is formed on the glass plate having this composition.

4. The process for producing a glass substrate for an information-recording medium according to claim 1, wherein the step of cleaning the glass plate, which is performed after the rough polishing step and before the fine polishing step, comprises the steps of cleaning with an alkaline detergent having pH of 13 or more, cleaning with an acidic detergent having pH of 1 or less, and cleaning with HF in this order.

* * * * *